US012328560B2

(12) United States Patent
Guthy et al.

(10) Patent No.: US 12,328,560 B2
(45) Date of Patent: Jun. 10, 2025

(54) ELECTRO-ACOUSTIC TRANSDUCER INCLUDING A MINIATURE VOICE COIL

(71) Applicant: Bose Corporation, Framingham, MA (US)

(72) Inventors: Csaba Guthy, Hopkinton, MA (US); David W. Beverly, Lunenburg, MA (US)

(73) Assignee: Bose Corporation, Framingham, MA (US)

( * ) Notice: Subject to any disclaimer, the term of this patent is extended or adjusted under 35 U.S.C. 154(b) by 337 days.

(21) Appl. No.: 17/976,987

(22) Filed: Oct. 31, 2022

(65) Prior Publication Data

US 2023/0051272 A1 Feb. 16, 2023

Related U.S. Application Data

(63) Continuation of application No. 16/541,745, filed on Aug. 15, 2019, now Pat. No. 11,528,572, which is a (Continued)

(51) Int. Cl.
*H04R 31/00* (2006.01)
*H04R 1/10* (2006.01)

(52) U.S. Cl.
CPC ........... *H04R 31/006* (2013.01); *H04R 31/00* (2013.01); *H04R 1/1033* (2013.01)

(58) Field of Classification Search
CPC .... H04R 31/006; H04R 31/00; H04R 1/1033; H04R 9/045; H04R 9/027; H04R 7/16;
(Continued)

(56) References Cited

U.S. PATENT DOCUMENTS 2,094,043 A 9/1937 Marshall
3,590,170 A 6/1971 Sawyer et al.
(Continued)

FOREIGN PATENT DOCUMENTS

CN 201163821 Y 12/2008
CN 101651921 A 2/2010
(Continued)

OTHER PUBLICATIONS

Non-Final Office Action in U.S. Appl. No. 16/541,745 mailed on Apr. 29, 2021; 7 pages.
(Continued)

*Primary Examiner* — Angelica M McKinney
(74) *Attorney, Agent, or Firm* — Schmeiser, Olsen & Watts LLP; Timothy P. Collins, Esq.

(57) ABSTRACT

A tool for arranging voice coil leadouts in a microspeaker comprises an expanding collet constructed and arranged for positioning at an interior of a bobbin having an inner diameter, the expanding collet including a hole that extends through an interior in a longitudinal direction of the expanding collet; a center pin extending through the hole of the expanding collet, the expanding collet applying a force against the inner diameter of the bobbin in response to a position of the center pin in the hole of the expanding collet relative to the interior of the expanding collet; and a forming mandrel including a hole that extends through an interior in a longitudinal direction of the forming mandrel. The expanding collet extends through the hole in, and coaxial with, the forming mandrel. The expanding collet rotates the bobbin about the longitudinal direction of the expanding collet relative to the forming mandrel to form helical leadout regions of a voice coil about the bobbin.

19 Claims, 9 Drawing Sheets

Related U.S. Application Data continuation of application No. 15/472,741, filed on Mar. 29, 2017, now Pat. No. 10,425,756.

(58) Field of Classification Search
CPC ... H04R 7/04; H04R 9/04; H04R 9/06; H04R 2201/029
See application file for complete search history.

(56) References Cited

U.S. PATENT DOCUMENTS

| | | | | |
|---|---|---|---|---|
| 3,828,144 | A | 8/1974 | Yamamuro et al. | |
| 3,963,882 | A | 6/1976 | Lewis | |
| 4,061,890 | A * | 12/1977 | Froeschle | H04R 7/16 381/409 |
| 4,225,756 | A | 9/1980 | Babb | |
| 4,225,757 | A | 9/1980 | Babb | |
| 5,937,076 | A * | 8/1999 | Tanabe | H04R 9/04 381/409 |
| 6,168,110 | B1 | 1/2001 | Stevens et al. | |
| 6,243,472 | B1 | 6/2001 | Bilan et al. | |
| 6,691,832 | B2 | 2/2004 | Moritake et al. | |
| 7,346,182 | B2 | 3/2008 | Sato et al. | |
| 7,460,682 | B2 | 12/2008 | Suzuki | |
| 8,107,665 | B2 | 1/2012 | Haapapuro et al. | |
| 8,155,372 | B2 | 4/2012 | North | |
| 8,155,374 | B2 | 4/2012 | Yuasa et al. | |
| 8,180,097 | B2 | 5/2012 | Harms et al. | |
| 8,391,538 | B2 | 3/2013 | Chiu et al. | |
| 8,798,309 | B2 * | 8/2014 | Tagami | H04R 9/027 381/415 |
| 9,716,424 | B2 | 7/2017 | Stoltenberg et al. | |
| 9,794,666 | B1 | 10/2017 | Beverly | |
| 9,986,355 | B2 | 5/2018 | Pare et al. | |
| 10,375,495 | B2 * | 8/2019 | Landemaine | H04R 9/045 |
| 11,128,971 | B2 * | 9/2021 | Landemaine | H04R 9/045 |
| 2004/0062415 | A1 | 4/2004 | Suzuki | |
| 2004/0197004 | A1 | 10/2004 | Suzuki | |
| 2004/0240702 | A1 | 12/2004 | Kaiwa et al. | |
| 2005/0084130 | A1 | 4/2005 | Yamagishi | |
| 2006/0231276 | A1 | 10/2006 | Robinson | |
| 2010/0303278 | A1 | 12/2010 | Sahyoun | |
| 2011/0033078 | A1 | 2/2011 | Liang et al. | |
| 2012/0183169 | A1 | 7/2012 | Yang | |
| 2012/0292401 | A1 | 11/2012 | Mahalingam et al. | |
| 2016/0331645 | A1 | 11/2016 | Bagwell et al. | |
| 2018/0288550 | A1 | 10/2018 | Guthy et al. | |

FOREIGN PATENT DOCUMENTS

| | | | |
|---|---|---|---|
| CN | 102665160 | A | 9/2012 |
| CN | 205408161 | U | 7/2016 |
| CN | 205754835 | U | 11/2016 |
| DE | 102008024816 | A1 | 11/2009 |
| EP | 2120482 | A1 | 11/2009 |
| EP | 2563042 | A1 | 2/2013 |
| EP | 2892248 | A1 | 7/2015 |
| FR | 1400579 | A | 5/1965 |
| GB | 776280 | | 6/1957 |
| JP | S61139196 | A | 6/1986 |
| JP | H07288894 | A | 10/1995 |
| JP | H08251693 | A | 9/1996 |
| JP | 3098127 | B2 | 10/2000 |
| JP | 2003153382 | A | 5/2003 |
| JP | 3531257 | B2 | 5/2004 |
| JP | 4575515 | B1 | 11/2010 |
| JP | 4594858 | B2 | 12/2010 |
| JP | 4820916 | B1 | 11/2011 |
| KR | 100817743 | B1 | 3/2008 |
| KR | 101077569 | B1 | 10/2011 |
| WO | 2001045213 | A1 | 6/2001 |
| WO | 2017015228 | A1 | 1/2017 |
| WO | 2017218183 | A1 | 12/2017 |

OTHER PUBLICATIONS

Final Office Action in U.S. Appl. No. 16/541,745 mailed on Oct. 6, 2021; 6 pages.
Non-Final Office Action in U.S. Appl. No. 16/541,745 mailed on Feb. 3, 2022; 6 pages.
Notice of Allowance in U.S. Appl. No. 16/541,745 mailed on Aug. 9, 2022, 2022; 5 pages.
Notice of Allowance in U.S. Appl. No. 15/181,989 mailed on Aug. 22, 2017; 12 pages.
International Preliminary Report on Patentability in PCT/US2017/035157 mailed on Dec. 27, 2018; 6 pages.
Notice of Allowance in U.S. Appl. No. 15/472,741 mailed on May 16, 2019; 10 pages.
International Search Report and Written Opinion in PCT/US2018/018278 mailed on May 15, 2018; 12 pages.
International Search Report and Written Opinion in PCT/US2018/018271 mailed on May 23, 2018; 13 pages.
International Search Report and Written Opinion in PCT/US2017/035157, mailed on Jul. 14, 2017; 9 pages.
Restriction Requirement in U.S. Appl. No. 15/783,499 mailed on Feb. 4, 2019; 5 pages.
Notice of Allowance in U.S. Appl. No. 15/783,499 mailed on Mar. 20, 2019; 10 pages.
International Preliminary Report on Patentability in PCT/US2018/018278 mailed on Oct. 10, 2019; 7 pages.
International Preliminary Report on Patentability in PCT/US2018/018271 mailed on Oct. 10, 2019; 7 pages.
First Office Action in Chinese Patent Application No. 201880033133.5 mailed on Jun. 2, 2020.
First Office Action in Chinese Patent Application No. 201880035277.4 mailed on Aug. 5, 2020.
Notice of Allowance and Fees Due in U.S. Appl. No. 16/445,581, mailed on Jul. 8, 2021; 8 pages.

* cited by examiner

ELECTRO-ACOUSTIC TRANSDUCER INCLUDING A MINIATURE VOICE COIL

RELATED APPLICATIONS

This application is a continuation application of U.S. application Ser. No. 16/541,745, filed Aug. 15, 2019 and entitled "An Electro-Acoustic Transducer Including a Miniature Voice Coil," which is a continuation application of U.S. application Ser. No. 15/472,741, filed Mar. 29, 2017, now U.S. Pat. No. 10,425,756 and entitled "Systems and Methods for Assembling an Electro-Acoustic Transducer Including a Miniature Voice Coil," the entirety of each of which is incorporated by reference herein.

BACKGROUND

This description relates generally to transducers for headphones, and more specifically, voice coil leadout configurations of a miniature electro-acoustic transducer.

BRIEF SUMMARY

In accordance with one aspect, a tool for arranging voice coil leadouts in a microspeaker, comprises an expanding collet constructed and arranged for positioning at an interior of a bobbin having an inner diameter, the expanding collet including a hole that extends through an interior in a longitudinal direction of the expanding collet; a center pin extending through the hole of the expanding collet, the expanding collet applying a force against the inner diameter of the bobbin in response to a position of the center pin in the hole of the expanding collet relative to the interior of the expanding collet; and a forming mandrel including a hole that extends through an interior in a longitudinal direction of the forming mandrel, the expanding collet extending through the hole in, and is coaxial with, the forming mandrel, wherein the expanding collet rotates the bobbin about the longitudinal direction of the expanding collet relative to the forming mandrel to form helical leadout regions of a voice coil about the bobbin.

Aspects may include one or more of the following features.

The expanding collet may include a set of jaws that apply a force against an inner diameter of the bobbin in response to a force applied by the position of the center pin in the hole of the expanding collet.

The collet jaws may include a plurality of arms that extend radially away from the center pin toward the bobbin.

The center pin may include a tapered portion that provides the force to the collet jaws.

The hole extending through the expanding collet includes a tapered region that mates with the tapered portion of the center pin. Pulling the center pin in an axial direction into the hole causes the collet jaws to expand against the inner diameter of the bobbin so that the bobbin may be rotated against tension forces of the leadout regions.

The tool may further comprise a center pin handle coupled to the center pin and configured to actuate the center pin to clamp or release the inner diameter of the bobbin.

The tool may further comprise a collet knob coupled to the expanding collet for rotating the bobbin.

The tool may further comprise two guide pins that extend from the forming mandrel for guiding the conductive wiring of the voice coil during formation of the helical leadout regions.

The tool may further comprise a guide insert positioned about the forming mandrel and is stationary relative to the expanding collet for receiving conductive wiring of the voice coil and forming the helical leadout regions.

In accordance with another aspect, a tool for forming voice coil leadouts in a microspeaker comprises an expanding mandrel constructed and arranged for positioning at an interior of a bobbin having an inner diameter, the expanding mandrel including a hole that extends through an interior in a longitudinal direction of the expanding mandrel; a center pin extending through the hole of the expanding collet, a portion of the expanding mandrel applying a force against the inner diameter of the bobbin in response to a position of the center pin in the hole of the expanding mandrel relative to the interior of the expanding mandrel; a coil spring positioned about the center pin and that abuts an opposite end of the expanding mandrel as an end at which the portion of expanding mandrel applies the force against the inner diameter of the bobbin; and a spring perch that causes the coil spring to compress between the spring perch and the expanding mandrel, wherein the expanding mandrel can be separated from the bobbin and the bobbin can be rotated about the longitudinal direction of the expanding mandrel relative to the expanding mandrel to form helical leadout regions of a voice coil about the bobbin.

Aspects may include one or more of the following features.

The coil spring in a partially compressed state may provide a force to the center pin that translates the force to the jaws of the expanding mandrel applying the force against the inner diameter of the bobbin to lock the bobbin to the collet.

The tool may further comprise a guide insert positioned about a portion of the expanding mandrel for positioning conductive wiring of the voice coil during formation of the helical leadout regions. The guide insert may include a vertical guide extending along a flat sidewall of the expanding mandrel to prevent rotation of the guide insert during formation of the voice coil leadouts.

The guide insert may remain with and is secured to the sleeve after formation of the helical leadout regions and assembly of the microspeaker.

The expanding mandrel may include a set of jaws that apply a force against an inner diameter of the bobbin in response to a force applied by the position of the center pin in the hole of the expanding mandrel.

The tool may further comprise a lock mechanism for compressing the coil spring to release the inner diameter of the bobbin and allow the formation of the helical leadout regions of a voice coil.

The tool may further comprise a bobbin rotation stage that rotates the bobbin when the jaws release the bobbin, and holds the expanding mandrel in a stationary position during rotation of the bobbin.

In accordance with another aspect, a tool for forming voice coil leadouts in a microspeaker comprises a mandrel constructed and arranged for positioning in an interior of a bobbin having an inner diameter; a center pin extending through the hole of the mandrel, the center pin having a base positioned in the interior of the bobbin; a coil spring positioned in the hole of the mandrel and about the center pin; and a compliant ring positioned in the interior of the bobbin between the base of the center pin and the mandrel, the compliant ring constructed and arranged to expand in a radial direction away from the center pin toward the bobbin when the coil spring is in an initial state.

Aspects may include one or more of the following features.

The base may be at one end of the center pin, and the tool may further comprise a spring perch at the other end of the center pin, the spring perch constructed and arranged to apply a force to the coil spring to at least partially compress the coil spring between the spring perch, the mandrel, and an inner diameter of the interior of the bobbin.

The tool may further comprise a helix formation part positioned about the bobbin that rotates about the bobbin to form helical leadout regions of a voice coil about the bobbin.

The tool may further comprise a retainer in the hole of the mandrel to hold the leadout ends in a vertical alignment at final assembly when placing the voice coil in a sleeve.

In accordance with another aspect, a method for assembling an electro-acoustic driver comprises positioning an expanding collet of a tool at an interior of a bobbin having an inner diameter, the expanding collet including a hole that extends through an interior in a longitudinal direction of the expanding collet; extending a center pin of the tool through the hole of the expanding collet; applying by the expanding collet a force against the inner diameter of the bobbin in response to a position of the center pin in the hole of the expanding collet relative to the interior of the expanding collet; extending a forming mandrel of the tool including a hole through an interior in a longitudinal direction of the forming mandrel; and rotating the bobbin about the longitudinal direction of the expanding collet relative to the forming mandrel to form helical leadout regions of a voice coil about the bobbin.

In accordance with another aspect, a method for assembling an electro-acoustic driver comprises positioning an expanding mandrel at an interior of a bobbin having an inner diameter, the expanding mandrel including a hole that extends through an interior in a longitudinal direction of the expanding mandrel; extending a center pin through the hole of the expanding collet; applying by a portion of the expanding mandrel a force against the inner diameter of the bobbin in response to a position of the center pin in the hole of the expanding mandrel relative to the interior of the expanding mandrel; positioning a coil spring positioned about the center pin; applying a force by a spring perch against the coil spring that causes the coil spring to compress between the spring perch and the expanding mandrel, wherein the expanding mandrel is separated from the bobbin; and rotating the bobbin about the longitudinal direction of the expanding mandrel relative to the expanding mandrel to form helical leadout regions of a voice coil about the bobbin.

In accordance with another aspect, a method for assembling an electro-acoustic driver comprises positioning a mandrel having a tapered end constructed and arranged for positioning in an interior of a bobbin having an inner diameter; extending a center pin through the hole of the mandrel, the center pin having a base positioned in the interior of the bobbin; positioning a coil spring in the hole of the mandrel and about the center pin; positioning a compliant ring in the interior of the bobbin between the base of the center pin and the tapered end of the mandrel; expanding the compliant ring in a radial direction away from the center pin toward the bobbin when the coil spring is in an initial state to secure the bobbin with the center pin and the mandrel; and rotating a helix formation part about the secured bobbin to form helical leadout regions of a voice coil about the bobbin.

BRIEF DESCRIPTION

The above and further advantages of examples of the present inventive concepts may be better understood by referring to the following description in conjunction with the accompanying drawings, in which like numerals indicate like structural elements and features in various figures. The drawings are not necessarily to scale, emphasis instead being placed upon illustrating the principles of features and implementations.

Figure 9B:
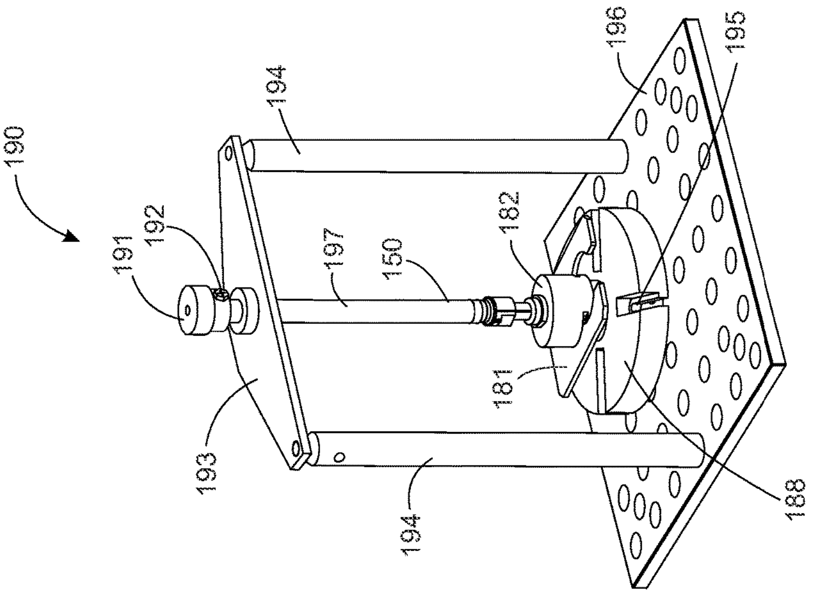
FIG. 9B is a close-up view of the bobbin rotation stage of FIG. 8A coupled to a bobbin rotation stage tool.
Figure 9A:
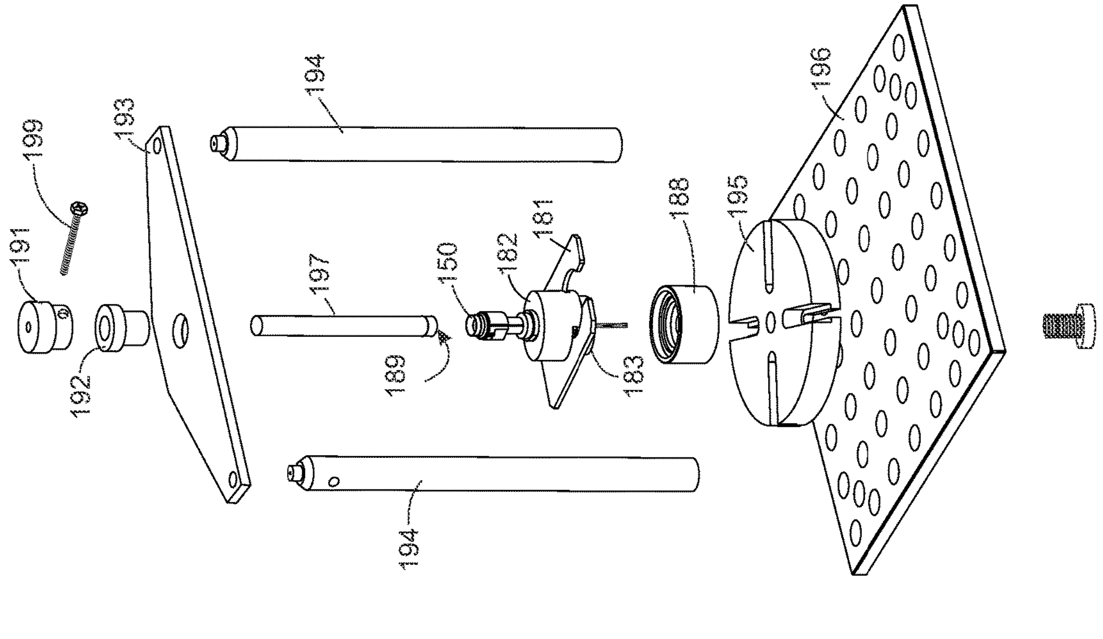
FIG. 9A is an exploded view of a bobbin rotation stage for a voice coil leadout forming tool, in accordance with some embodiments.
Figure 10:
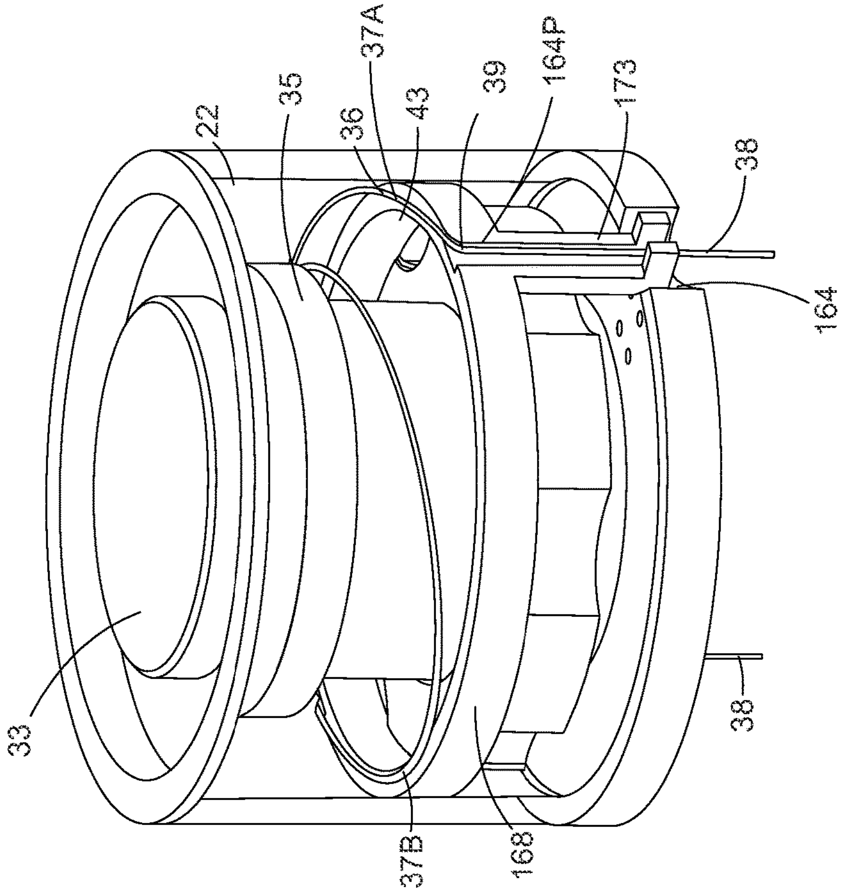

FIG. 10 a perspective view of an assembled electro-acoustic transducer formed at least in part by the voice coil leadout forming tool of FIGS. 5A-9, in accordance with some examples.

Figure 11:
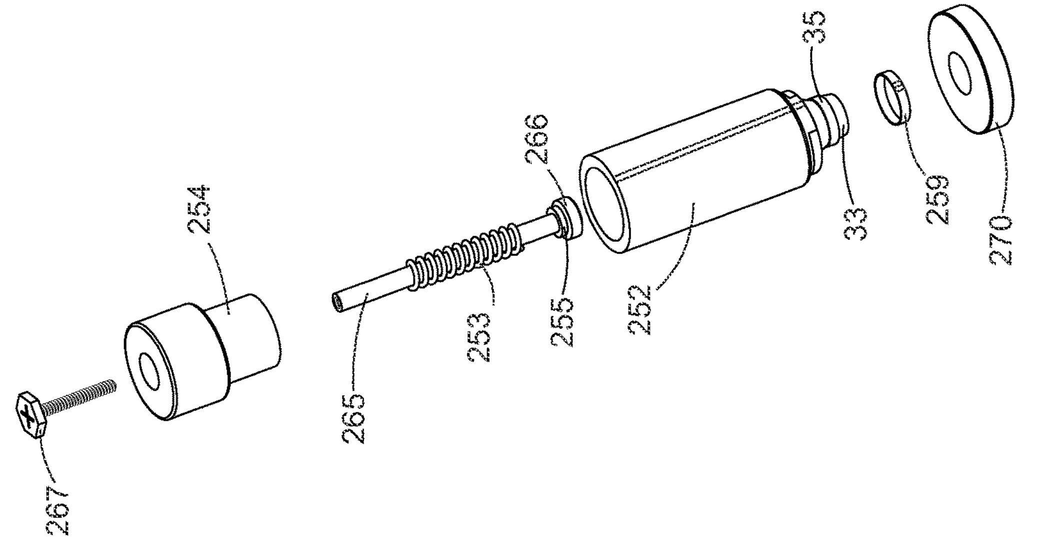

FIG. 11 is an exploded view of a voice coil leadout forming tool, in accordance with some examples.

Figure 12:
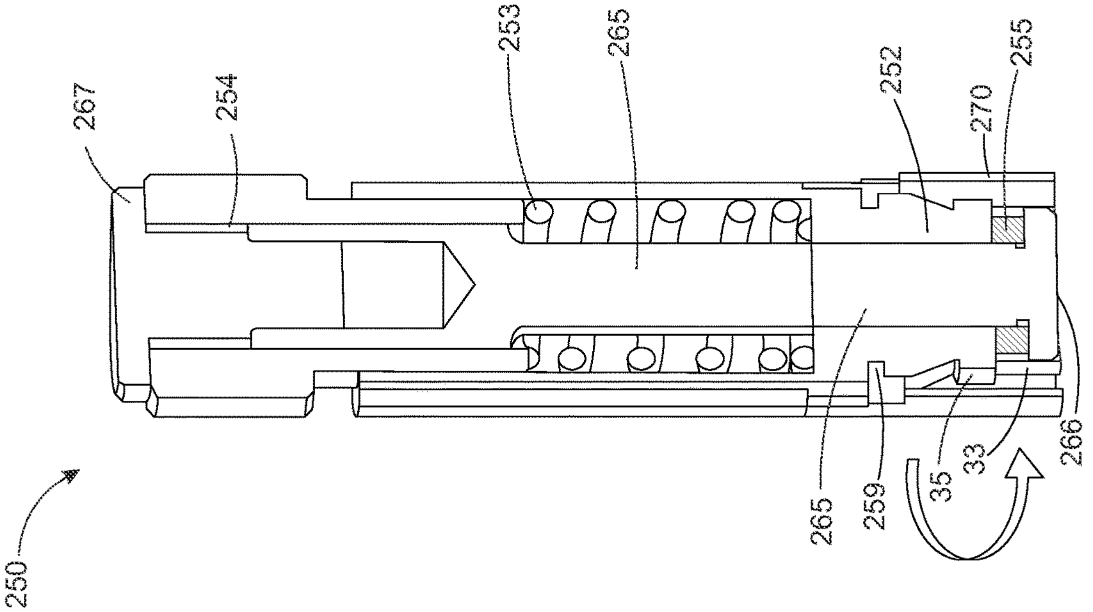

FIG. 12 is a cross-sectional front view of the voice coil leadout forming tool of FIG. 11 forming voice coil leadouts for a microspeaker.

Figure 13:
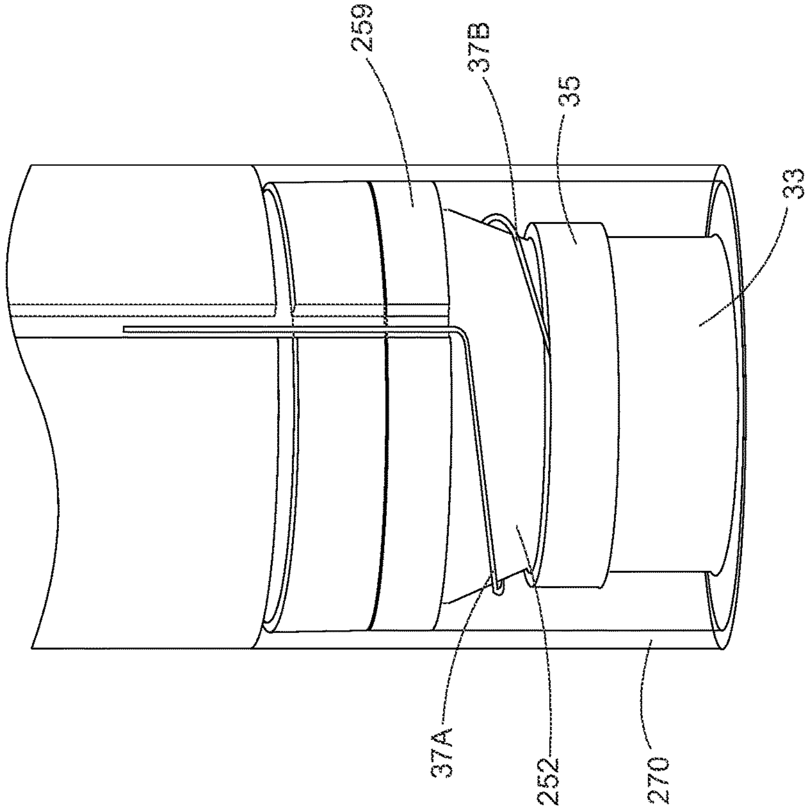

FIG. 13 is a perspective view of an assembled electro-acoustic transducer formed at least in part by the voice coil leadout forming tool of FIGS. 11 and 12, in accordance with some examples.

DETAILED DESCRIPTION

Modern in-ear headphones or earbuds typically include a microspeaker, also referred to as a miniature electro-acoustic transducer or driver. A voice coil drives the diaphragm to vibrate. In doing so, the diaphragm pushes the air around it, which in turn creates a sound that is output to a user.

A typical voice coil is configured to receive electrical signals from a printed circuit board (PCB) via contacts or terminals by electrically conducting lead wires thereof to the contacts or terminals. To achieve this, a typical voice coil used in a microspeaker includes leadouts that extend from the voice coil to the contacts or terminals at the transducer sleeve, which in turn are conductively connected directly or indirectly to the PCB.

The formation of a conventional miniature voice coil and the constraining of voice coil wire in the housing, or sleeve, in an earbud transducer is difficult, and requires complicated tooling and manufacturing procedures. In particular, in order for the leadouts of the conductive wires to extend from the voice coil for attachment to a circuit board or the like, the region of coil wire between the voice coil windings and sleeve wall is typically supported by intermediate wire bonding points at the diaphragm or surround, requiring additional complexity in the assembly process.

In brief overview, provided are systems and methods for forming leadouts that address the foregoing. In particular, conventional microspeakers include leadouts attached to a suspension, and are prone to mechanical failures due to fatigue. The systems and methods described herein provide for leadouts which are (1) formed from the coil wire itself, i.e., no additional bonding points), (2) substantially unsupported along its length, and (3) comprised of a helical configuration due to the need to minimize the strain in the leadouts at high excursions to prevent breakage of the wire.

Figure 1:
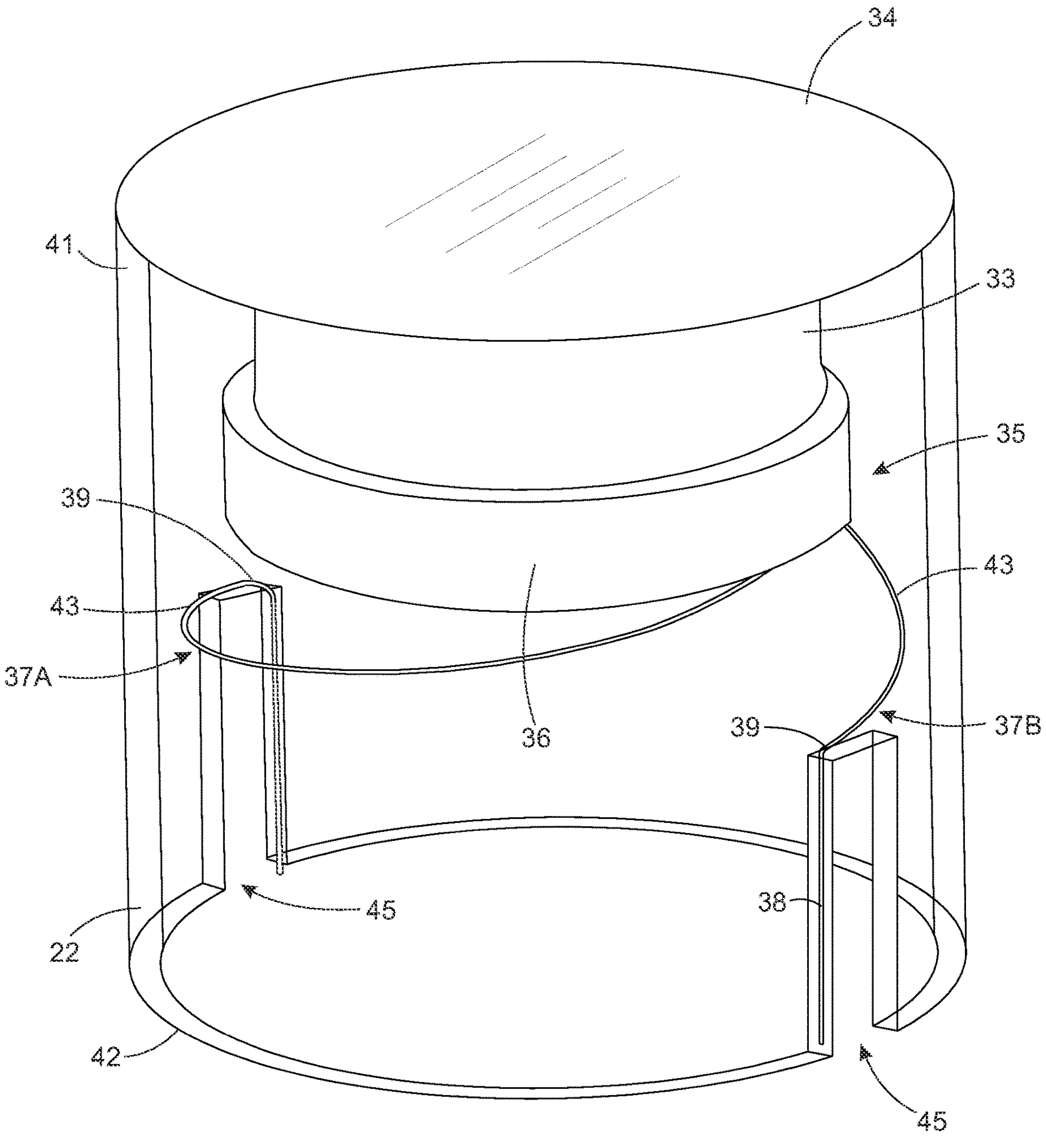
FIG. 1 is a perspective view of an electro-acoustic transducer (excluding a magnet and back plate) exposing an interior of the transducer, according to some examples.

Referring to FIG. 1, an electro-acoustic transducer comprises a miniature voice coil 35 comprising a pair of helicoidal leadout regions 37A, B at the ends of a conductive voice coil wire 35. The leadout regions 37A, B may include connection portions (not shown) at their distal ends respectively so that the leadout regions 37A, B may be electrically connected to lead wires or other conductive connectors. The electro-acoustic transducer may also include but not be limited to a sleeve 22, a magnet assembly (not shown in FIG. 1) and an electrically insulated cylindrical bobbin 33. The sleeve 22 may have a first end 41 and a second end 42. The bobbin 33 may be coupled to a diaphragm 34 positioned about an opening or cavity of the sleeve 22, for example, at or near the first end 41. A printed circuit board (PCB) (not shown) may be positioned at or near the second end 42 of the sleeve 22 opposite the first end 41 to provide contact pads to which the ends of the leadout end regions 37A, 37B may be soldered or otherwise coupled.

The voice coil 35 includes a main windings region 36 and two leadout regions 37A and 37B. A conductive main body configured as at least one winding 36 positioned about the bobbin 33. The voice coil 35 may be formed of copper wire or other conductive material. The two ends of the voice coil 35 include a first leadout end region 37A and a second leadout end region 37B, which are constructed and arranged to provide electrical connections to the voice coil 35 while allowing the voice coil to move repeatedly in axial direction without breaking. In some examples, the conductive wiring forming the windings 36 and leadout end regions 37A, 37B of the voice coil 35 is about 30 microns in diameter, but not limited thereto. The electrical connections provided by the leadout regions 37A, 37B allow for acceptance of electrical signals or may be imparted through the PCB or the like (not shown). The electrical signals provided to the voice coil 35 create the force required to move the diaphragm inward or outward relative to the magnet, or magnetic circuit.

The first and second leadout end regions 37A, 37B, in particular, helical portions 43 of the leadout end regions 37A, B, respectively, for example, forming a 180 degree helix of the leadout end regions 37A, 37B, may extend tangentially from the windings 36 of the voice coil 35, i.e., the portion of the voice coil 35 having a helicoidal configuration, in a direction away from the bobbin 33. In addition to the helical portions 43, each of the leadout end regions 37A, 37B may have a bend 39, for example, 90 degree bend, and a straight portion 38 at a distalmost end of the leadout end regions 37A, 37B. In some examples, the leadout end regions 37A, 37B, more specifically, the bend portions 39 are constructed and arranged to extend from the sleeve 22 during assembly via openings, recesses, or slots, referred to as wire exit recesses 45, for example, spaced apart 180 degrees as shown.

The leadout end regions 37A, 37B may be freely suspended as shown, i.e., not bonded to the surround but instead occupying a space between the voice coil 35 and the ID of the sleeve 22. Accordingly, the first leadout region 37A and the second leadout region 37B may extend along a same axis, but not limited thereto. In some examples, the wire exit recesses 45 may be spaced apart 90 degrees, 120 degrees, 150 degrees, and so on about the circumference of the 2nd end 42 of the sleeve 22.

In brief overview, the leadout regions 37A, 37B (generally, 37) of an electro-acoustic transducer shown in FIG. 1 may be formed by a voice coil leadout forming tool, for example, shown in FIGS. 2A-4, 5A-8, 9-10, and 11A-12B, with an objective of automating leadout forming and assembly. In some examples, the tool is constructed and arranged to clamp and release the inner diameter of the bobbin in order to form desired helical-shaped voice coil leadout configurations for microspeaker applications.

Referring to an example illustrated at FIGS. 2A-4, a tool 50 is illustrated for forming a desired voice coil leadout configuration. The leadout end regions 37A, 37B may each have a same configuration as that illustrated in FIG. 1, e.g., a 180 degree helical portion 43, a 90 degree bend 39, and a distal straight portion 38.

The tool 50 comprises an expanding collet 52 and a forming mandrel 54 configured to rotate about the expanding collet 52. A center pin 65 is positioned in a hole 53 (see FIGS. 2B and 3) that extends axially, or in a direction of extension from the tapered region 60 through an interior of the expanding collet 52.

Figure 2C:
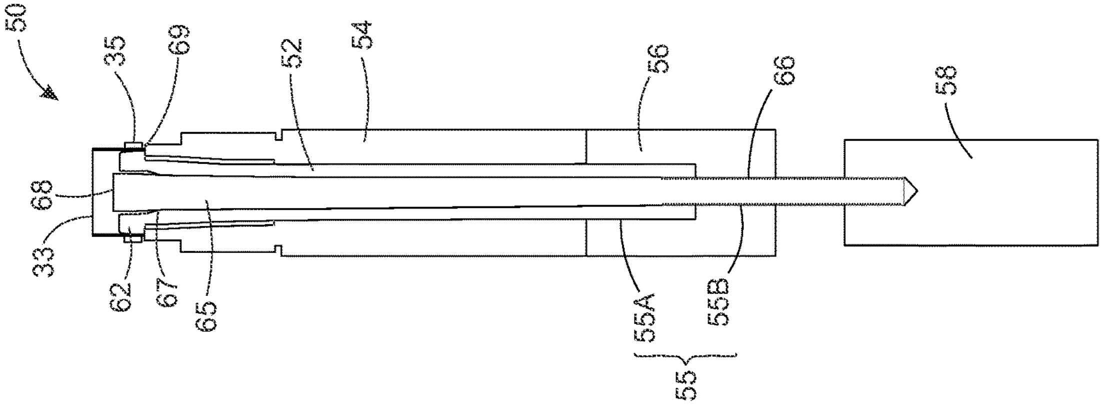
FIG. 2C is a cross-sectional front view of the voice coil leadout forming tool of FIGS. 2A and 2B.
Figure 2B:
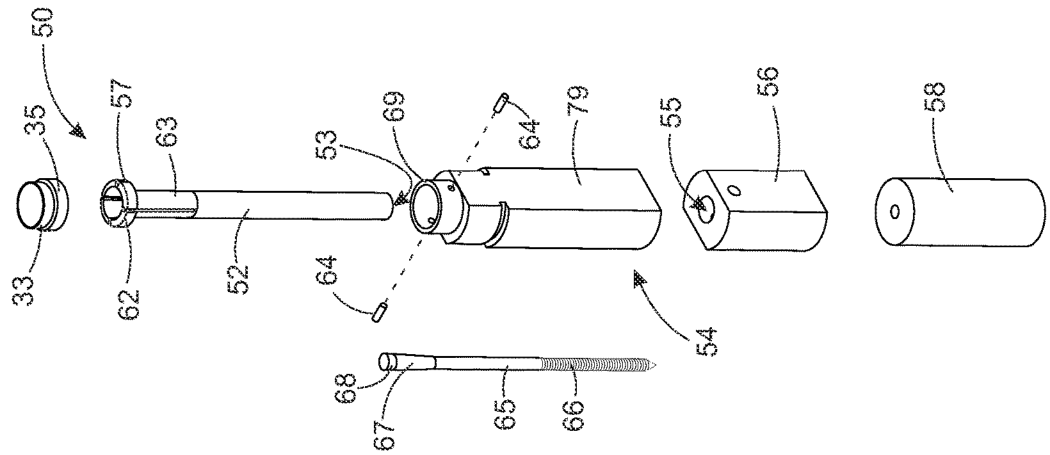
FIG. 2B is an exploded view of the voice coil leadout forming tool of FIG. 2A.
Figure 2A:
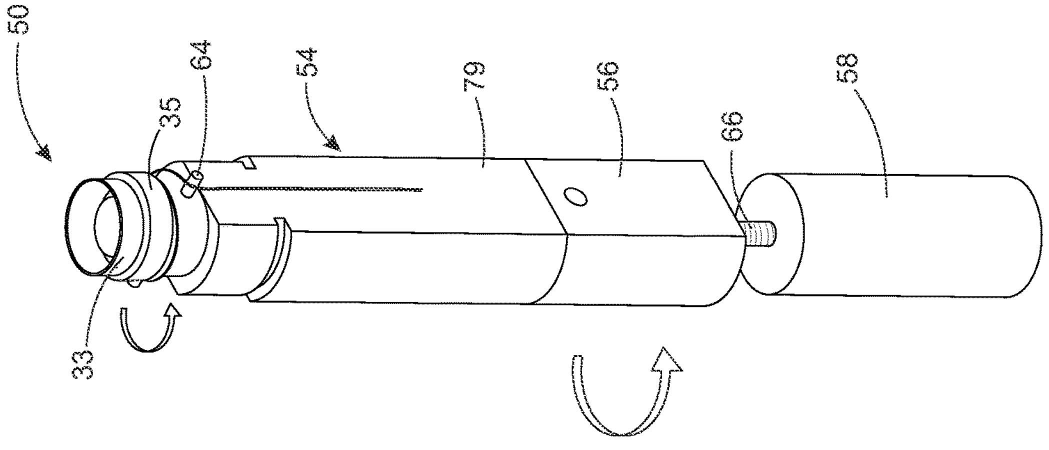
FIG. 2A is a perspective view of a voice coil leadout forming tool, in accordance with some examples.

In FIGS. 2A-2C, the expanding collet 52 has a first end, or distal end, comprising a plurality of jaws 62 constructed to apply a force against, or clamp, an inner diameter of a bobbin 33 when expanded radially away from the center pin 65 toward the bobbin 33. The expanding collet 52 may be formed of metals, composites, plastics, or a combination thereof. The jaws 62 of the collet 52 may be formed by two, perpendicular deep and narrow cuts along the axial directions, effectively forming four "arms". In other examples, the jaws 52 may include any number of arms. The arms preferably have a thinner wall thickness away from end of the jaw. The thinner wall thickness away from the jaw ends to make the jaw arms flexible is achieved by the smaller outer diameter in the neck region 171. The arms having a thinner wall thickness in the neck region 171 may be flexible, or elastically deformable. The material may include a metal such as aluminum, but may comprise any material with a sufficiently high elastic deformation limit, such as other metals and/or polymers.

Figure 3:
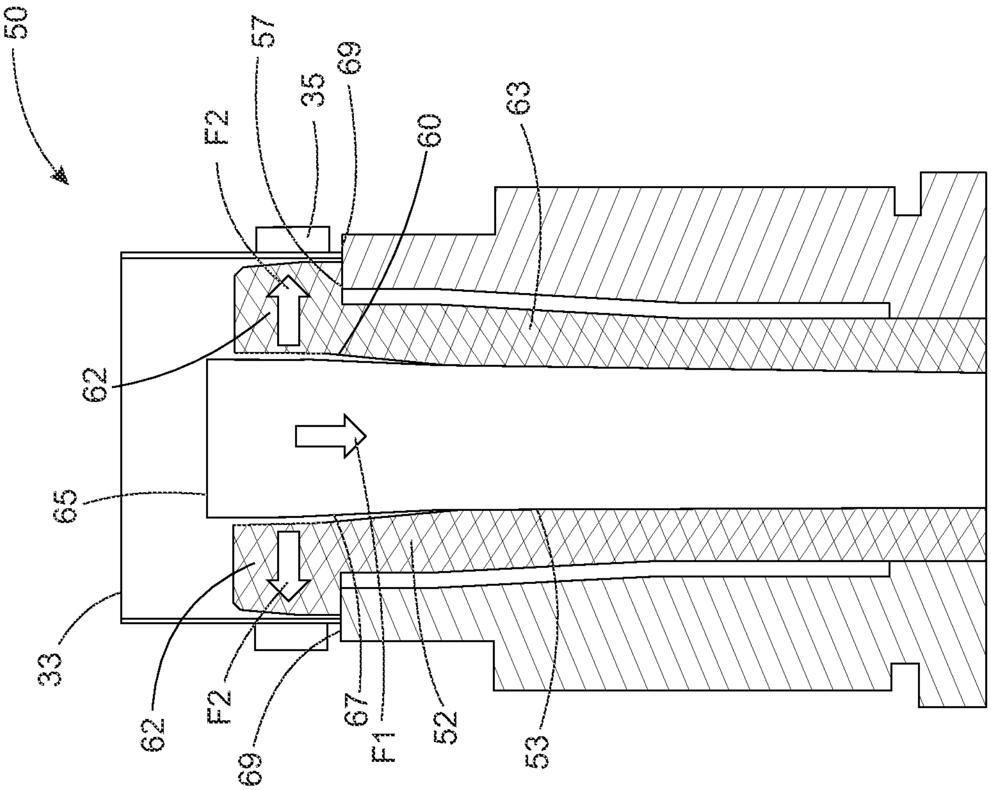
FIG. 3 is a close-up cross-sectional view of the voice coil leadout forming tool of FIGS. 2A-2C positioned at and applying a force against a bobbin in accordance with some examples.
Figures 5A, 5B, 5C:
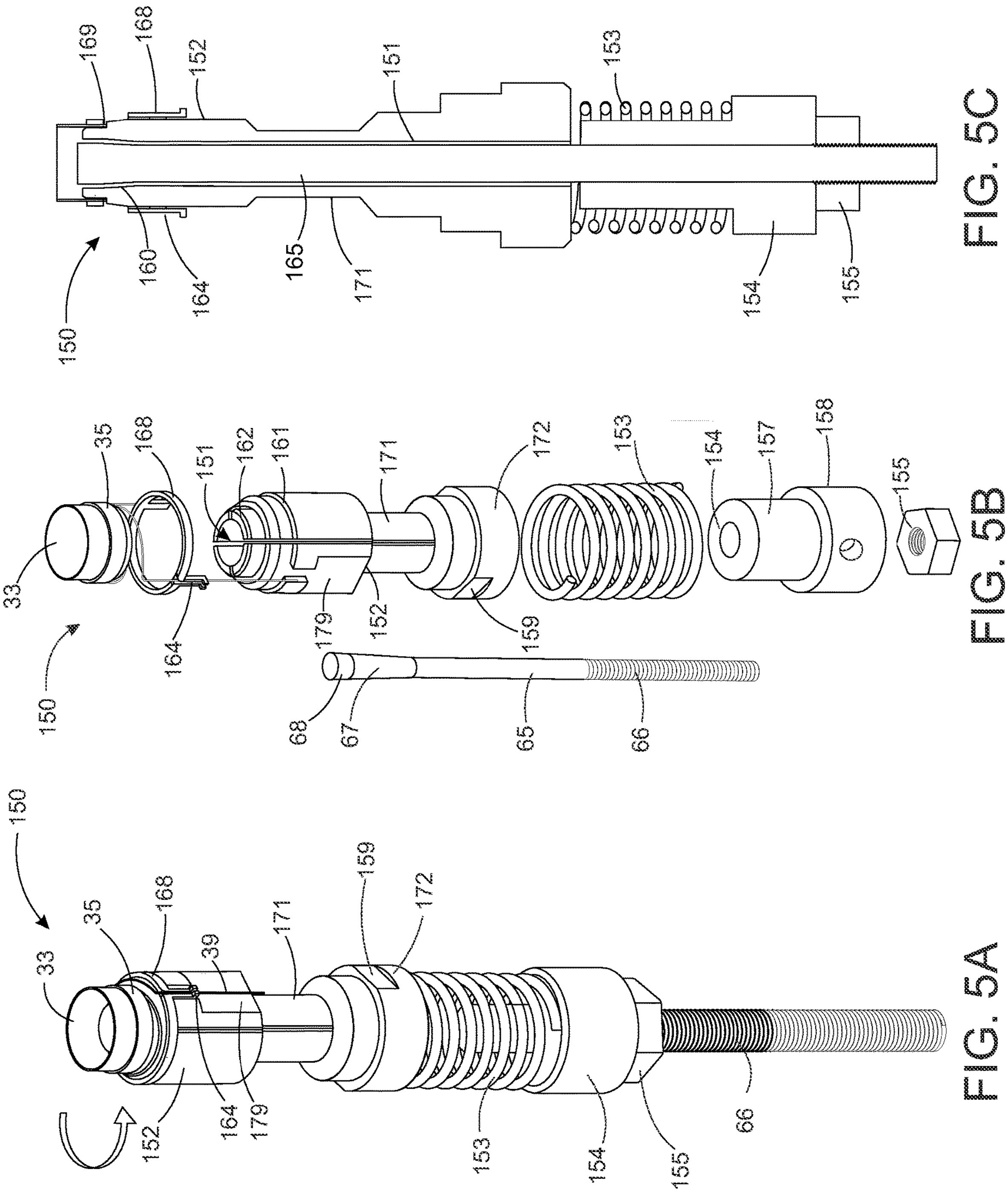
FIG. 5A is a perspective view of a voice coil leadout forming tool, in accordance with some examples.
FIG. 5B is an exploded view of the voice coil leadout forming tool of FIG. 5A.
FIG. 5C is a cross-sectional front view of the voice coil leadout forming tool of FIGS. 5A and 5B.

As shown in FIG. 3, the hole 53 extending through the expanding collet 52 includes a tapered region 60 at the arms of the jaws 62 that mates with a tapered portion 67 of the center pin 65. When a downward force (F1) is applied to the center pin 65, i.e., the center pin 65 is pulled in a direction away from the bobbin 33. In response, the collet jaws 62 expand in a radial direction to apply a force (F2) against the inner diameter of the bobbin 33. In some examples, the collet jaws 62 can be expanded at or about 100 microns from an initial state to an expanded state in the radial direction, but not limited thereto. This enables to either securely clamp the bobbin or completely release it on demand without the need for excessively tight tolerance requirements of the assembly components, such as the inner diameter of the bobbin 33. The tapered portion 67 of the center pin 65 has a width, cross-sectional area, or other dimension that is more than a corresponding dimension of the tapered region 60 of the hole 53 receiving the tapered portion 67 that the collet jaws 62 are forced apart in the radial direction when the center pin 65 is pulled downwards with respect to collet 52. A topmost region 68 of the center pin 65 has a cylindrical configuration, for example, a constant outer diameter. The tapered portion 67 transitions a diameter, width or other dimension of the cylindrical top region 68 to a smaller constant diameter, width, or other like dimension of the center pin 65 below the tapered portion 67.

The collet knob 56 is coupled to the expanding collet 52, for example, bonded at regions 55A using adhesives or the like for rotating the collet 52. The collet knob 56 may include a hole permitting the collet knob 56 to be positioned about a lower portion of the expanding collet 52 extending from the forming mandrel 54 and for receiving a portion of the center pin 65. For example, as shown in FIG. 2C, the collet knob 56 has a hole 55 that includes a first portion 55A having a diameter for receiving the expanding collet 52 and a second threaded portion 55B having a diameter for receiving the center pin 65, more specifically, for mating with the threaded portion 66 of the center pin 65.

Thus, when a user rotates the collet knob 56 (shown by arrow in FIG. 2A), the expanding collet 52 likewise rotates since the collet knob 56 is interlocked or otherwise coupled to the collet 52 using adhesives or the like. The bobbin 33 and voice coil 35 may also rotate resulting in formation of the leadout end regions 37. In doing so, rotating collet knob 56 with respect to forming mandrel 54 also rotates the collet jaws 62, as well as the bobbin 33 when the jaws 62 are expanded. This approach enables leadout forming without requiring access to both ends of the bobbin 33 and as such is also suitable for leadout forming after the bobbin 33 attached to the suspension subassembly (Si piston).

A center pin handle 58 may be at a proximal end of the center pin 65, for example, coupled to the threaded end 66, and configured to actuate the center pin to clamp or release the inner diameter of the bobbin. Various mechanisms may be used to actuate the center pin 65. The handle 58 may receive directly a force that pulls or pushes the center pin 65 with respect to the collet to expand or release the jaws 62. The handle 58 may be rotated to actuate the center pin 65 using mating threads on the center pin 65 and in the collet knob. Here, a force may be applied directly to the handle 58 to pull the center pin 65 in a direction away from the bobbin 33 to expand the collet jaws 62 in the radial direction against the bobbin 33 so that the collet knob 56 can be used to rotate the bobbin 33 to form the helicoidal shape of the leadout regions 37. Alternatively, the center pin 65 may have a threaded portion 66 that engages with the threaded region 55B in the collet knob 56. At least a portion of the threaded portion 66 of the center pin 65 may extend or protrude from the collet knob 56 for coupling with the center pin handle 58. The threads provide another mechanism to control the position of the center pin inside the collet to clamp or release the bobbin (by rotation of the center pin handle with respect to the collet knob). These are examples of mechanisms for actuating the center pin so that the tapered region 67 of the center pin 65 is in a position in the hole 53 of the expanding collet 52 for applying a force to the collet jaws 62. However, other actuation mechanisms for actuating the center pin 65 may equally apply.

Figure 4:
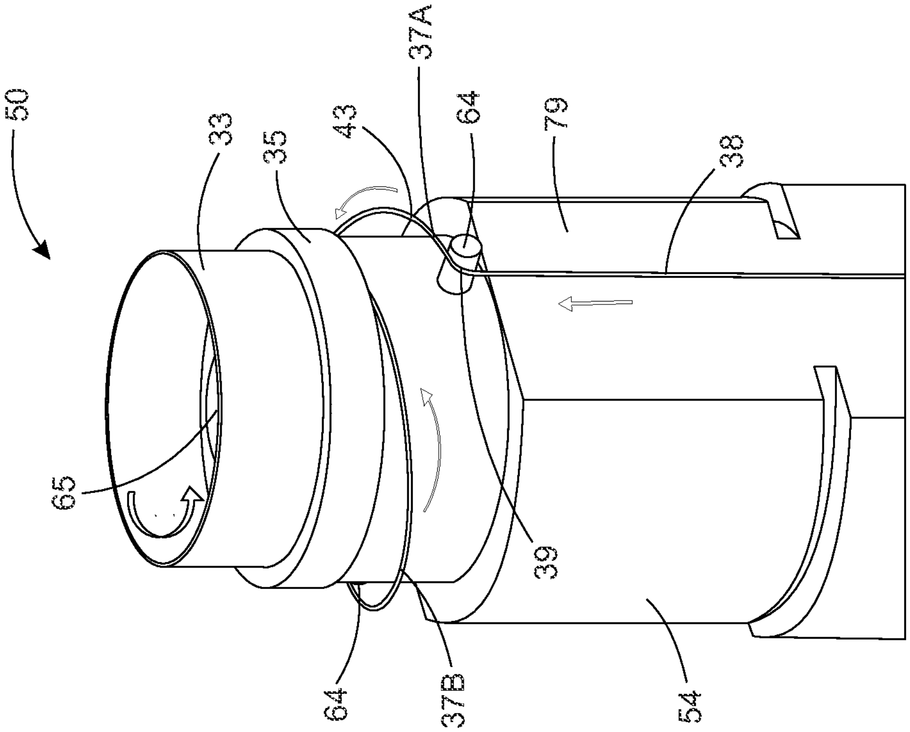
FIG. 4 is a close-up perspective view of the voice coil leadout forming tool of FIGS. 2A-3 rotating the bobbin for forming helical-shaped leadouts.

The forming mandrel 54 is positioned about, and coaxial with, the expanding collet 52, and can rotate freely about the collet. The material may include metals such as aluminum and/or polymer materials, but not limited thereto. During an operation where helicoidal leadouts (e.g., 37A, 37B) are formed during assembly of a microspeaker, the forming mandrel 54 may rotate with respect to expanding collet 52 after the collet jaws 62 are expanded to secure an interior surface of bobbin 33 against the outer surface of the expanding collet jaws 62. During this operation, in some examples, the expanding collet 52 rotates the bobbin 33 while the forming mandrel 54 remains stationary, as shown in FIG. 2A and FIG. 4. In other examples, the forming mandrel 54 rotates relative to the expanding collet 52.

At least two guide pins 64 may extend from the forming mandrel 54 for receiving a portion of conductive voice coil wire 35 and for forming the bend portion 39 of the leadout end regions 37A, 37B. In some examples, two guide pins 64 are provided which are positioned 180 degrees from each other relative to the top view of the forming mandrel 54. Here, each guide pin 64 may receive a portion of voice coil wiring 35 that subsequently forms a leadout end region 37A, 37B (generally, 37). The location, number, and configuration of the guide pins 64 is not limited to those shown and described. The conductive voice coil wiring 35 slides (as shown by arrows in FIG. 4) with little resistance (due to wire tensioning) along the guide pins 64 during formation of a leadout end region 37. The amount of tensioning of the voice coil wiring is important during the formation to a) prevent the wire from jumping over the guide pins 64 and b) to (at least partially) plastically/permanently deform the wire to the desired shape. Excessive tensioning on the other hand would result in wire breakage. One convenient way to tension the wire is to press the straight section 38 of the wire against the flat area, or sidewall 79, of the forming mandrel 54 with a controlled force/pressure while rotating the collet knob 56 with respect to the forming mandrel 54. Tension is established due to the sliding frictional force as the wire slides on the flat surface of mandrel. Other tensioning methods could be used as well.

In some examples, as shown in FIG. 3, a bobbin 33 may be positioned on a top surface 69 of the forming mandrel 54. Here, a portion of the jaws 62 of the expanding collet 52 may be positioned on the top surface 69 of the forming mandrel 54 (see FIG. 3). The base region 57 of the expanding collet 52 forming the jaws 62 preferably has a greater width, diameter, surface area, or other dimension than that of the neck 63 of the expanding collet 52. The T-shaped configuration of the expanding collet 52 including the neck and base region 57 permit the base region 57 to provide a surface that is positioned on the topmost surface 69 region of the forming mandrel 54. Thus, when the jaws 62 expand in the radial direction, the base region 57 of jaws 62 may slide along the top surface 69 radially towards the inner diameter (ID) of the bobbin 33.

As shown by the arrows in FIGS. 4, respectively, as the bobbin 33 is rotated about stationary mandrel 54, for example, by rotation of the collet knob 56, the voice coil wire 35 moves vertically along the sidewall 79 of the forming mandrel 54 and about the two guide pins 64 to form the helical portion 43 of the leadout end regions 37A, 37B at the top region of the forming mandrel 54, and to allow the bend 39 of the leadout end regions 37A, B to extend from the helical portion 43, and for the straight portion 38 to extend down the side of the forming mandrel 54, and subsequently, i.e., after assembly, down the side of the transducer housing. In some examples, the leadout end regions 37A, B may be formed after the bobbin 33 and voice coil 35 are assembled in the housing.

In some examples, the tool 50 uses a microspeaker sleeve as a guide to align the bobbin 33 and voice coil assembly 35. Alignment may be achieved simply from mating of the inner diameter surface of the sleeve 22 and the outer diameter surface of the forming mandrel 54 (intermediate diameter in FIG. 3). A step to the largest diameter serves as a stop to the sleeve end for alignment of the sleeve at the other end with the end of the bobbin 33. Thus, the sleeve 22 and bobbin 33 can be aligned concentrically accurately, e.g., within 10 um accuracy. The high accuracy of concentric alignment of bobbin (and thus voice coil) with respect to the sleeve and magnet allows to keep the magnetic gap of the motor to a minimum, which in turn results in increased magnetic flux through the coil and hence increased motor performance.

Referring to an example illustrated at FIGS. 5A-8, a tool 150 is illustrated for forming a desired voice coil leadout configuration, for example, shown in FIG. 10.

The tool 150 comprises an expanding mandrel 152 (also referred to as an expanding collet), a coil spring 153, a spring perch 154, a center pin 65, and a guide insert 168. The center pin 65 may be similar to or the same as the center pin 65 described with reference to the example tool 50 of FIGS. 2-4. Details thereof are not repeated due to brevity.

The expanding mandrel 152 includes a set of jaws 162, a neck 171, and a base 172, and a hole 151 that extends in a direction of extension of the expanding mandrel 152 through the jaws 162, neck 171, and base 172. The center pin 65 is inserted in the hole 151 in the expanding mandrel 152 and also through a hole in the spring perch 154. The center pin 65 has tapered region 67 that can cause the mandrel jaws 162 to expand during a voice coil formation operation.

In some examples, a portion of the base 172 includes two flat surfaces 159, referred to as flats, which are positioned 180 degrees from each other on the base 172. The flats 159 are constructed and arranged to hold the mandrel 152 in a stationary position as the bobbin 33 is rotated during formation of the voice coil leadouts 37A, B. To achieve this, the center pin 65 operates to lock or release the inner diameter of the bobbin 33, i.e., so that when the spring 153 is completely compressed, the jaws 162 release the bobbin 33 so that it can be rotated with little or no resistance. In comparison with the first version of the tool (tool 50 of FIGS. 2A-4), the tool 150 in this example does not rotate the bobbin on its own. An external bobbin rotation stage, described with reference to FIGS. 9A and 9B, may therefore be provided to assist with bobbin rotation.

The coil spring 153 is positioned between a distal surface of the expanding mandrel 152 and a base 158 of the spring perch 154. The spring perch 154 includes a neck 157 that is in the interior/windings/helix of the coil spring 153. The spring 153 can be made from any suitable elastic material, most commonly from steel, brass or bronze. The spring rate may be suitable such that at reasonable compressions the force is sufficient but not too excessive to spread the jaws 162 and clamp the inner diameter of the bobbin 33 with enough force to prevent bobbin rotation due to tensioning of the voice coil wiring. If the force is too high, the bobbin 33 will be stretched permanently and won't fit during subsequent assembly steps. The spring rate for the spring 153 in the prototype was ~8 lbs/inch, capable of producing a maximum of ~2 lbs of force (or ~9 Newtons) for example. The actual compression of the spring 153 and thus the force can be adjusted using nut 155. For example, the spring 153 is initially compressed to some degree using the nut 155 to achieve a certain clamping force between the bobbin 33 and jaws 162. When unclamping the bobbin 33, the spring 153 is further compressed by applying a force to the spring perch 154 against the mandrel base 172

Figure 6:
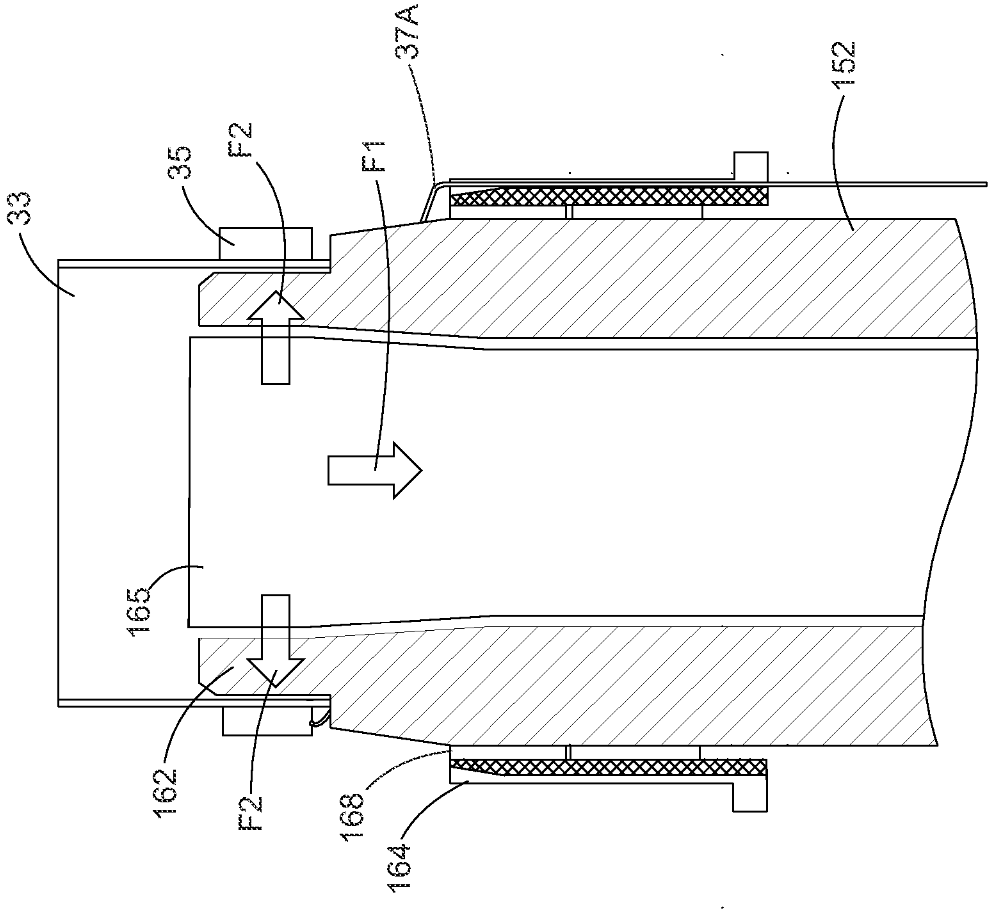
FIG. 6 is a close-up cross-sectional view of the voice coil leadout forming tool of FIGS. 5A-5C positioned at and applying a force against a bobbin in accordance with some examples.

As shown in FIG. 6, when a downward force (F1) is applied to the center pin 65, i.e., the center pin 65 due to its tapered configuration applies a force against the mandrel jaws 162, which in turn expand in a radial direction to apply a clamping force (F2) against the inner diameter of the bobbin 33. At least a portion of a threaded portion 66 at a bottom region of the center pin 65 may extend or protrude from the spring perch 154. In some examples, an optional threaded nut 155 can be positioned about the threaded portion 66 and can fine-tune the compression of the spring 153 by applying a force against the spring perch 154. The center pin 65 can move in an axial direction relative to the coil spring 153 and expanding mandrel 152.

Figure 7:
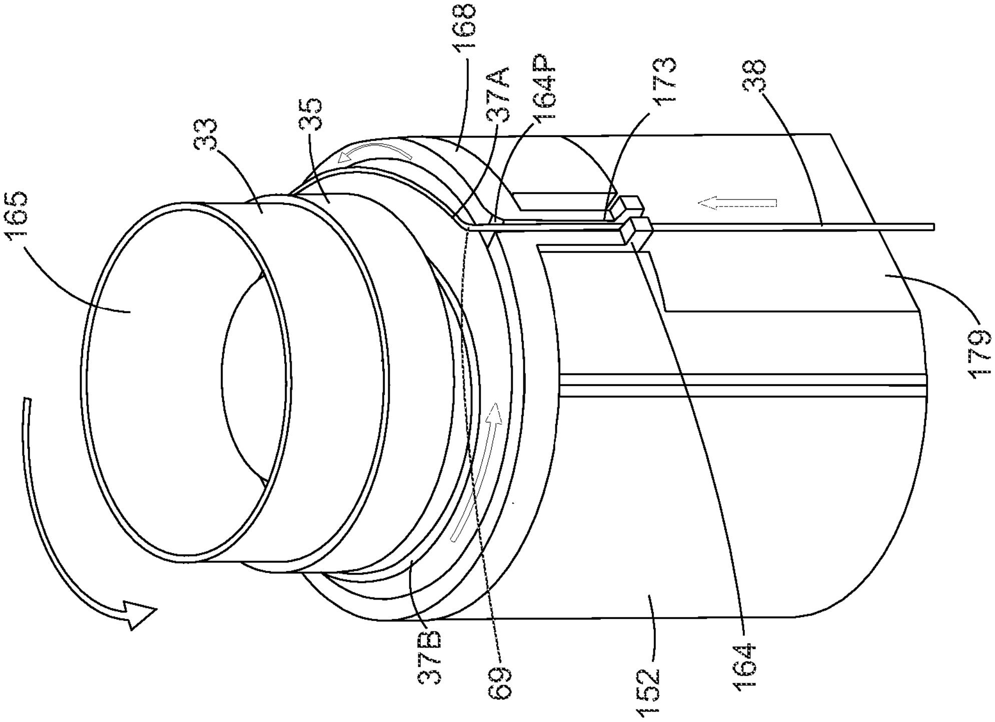
FIG. 7 is a close-up perspective view of the voice coil leadout forming tool of FIG. 6 rotating the bobbin for forming helical-shaped leadouts.

As shown in FIG. 7, the voice coil leadouts 37A, 37B (generally, 37) are formed by rotating the bobbin 33 and voice coil 35 about expanding mandrel 152, which is separated from the inner diameter of the bobbin 33 due to the compression of the coil spring 153. The coil spring 153 may be compressed by a force applied against the coil spring 153 when a force is applied to the surfaces of the base 172 of the expanding mandrel 152 against the spring perch 154. Here, the expanding mandrel 152 and coil spring 153 move in axial direction relative to the center pin 65 so that the tapered top region 67 of the center pin 65 is separated from the mandrel jaws 162, which in turn reduces or eliminates the force F1 applied against the jaws 162, which in turn frees the bobbin 33 to rotate about the expanding mandrel 152.

Also, the first and second leadout regions 37A, B of voice coil 35 are inserted into grooves 173, or notches or the like, that are positioned along the axial direction on the outer surface of the guide insert 168. Each groove 173 extends along the total height of guide insert 168 including the two vertical guides 164 section and the top section of the guide insert 168. A top rounded edge 164P of the groove 173 is configured to form the 90 degree bend 39 of the wiring 76. The guide insert 168 in turn is positioned on a top surface 161 of a region of the expanding mandrel (see FIG. 5B). The expanding mandrel 152 may include one or more vertical flats 179, or grooves, notches, or the like, for receiving and securing a respective vertical guide 164 to prevent rotation of the guide insert 168 during formation of the voice coil leadout configuration. Here, each vertical guide 164 extends along a flat sidewall 179 of the expanding mandrel 152, and portions of conductive wiring of each leadout region 37A, B are inserted in grooves, slots, or the like 173 of the respective vertical guide 164. During formation of the leadout configuration, a force is applied to a shaft 197 (see FIGS. 9A, 9B), which in turn applies a force against the bobbin 33 directly abutting a surface 169 of the mandrel 152 (for example, compared to surface 69 shown in FIG. 3). The shaft 197 may have a rubber tip 189 or other related material that has similar characteristics as rubber for engaging with the bobbin 33. The difference between friction coefficients between the shaft tip/bobbin interface, and bobbin/tool interface is required for engaging and rotating the bobbin 33 to form the voice coil leadouts 37.

The interface formed between the rubber-tipped shaft 197 (FIGS. 9A, 9B) and bobbin 33 provides a higher friction force than the interface between the bobbin 33 and metal surface 169, e.g., top surface of the mandrel 152, allowing the bobbin 33 to be rotated. This is due to the rubber tip 189 providing a higher friction coefficient at the rubber/bobbin interface compared to that at the bobbin/metal surface interface. The straight portions 38 of the leadout end regions 37A, 37B are pressed (with a controlled force/pressure) against the flat sidewall 179 against which the vertical guide 164 is aligned. This is one approach for creating tension in the leadout end regions 37A, 37B as the bobbin 33 is rotated. However, other tensioning methods may equally apply.

Figure 8B:
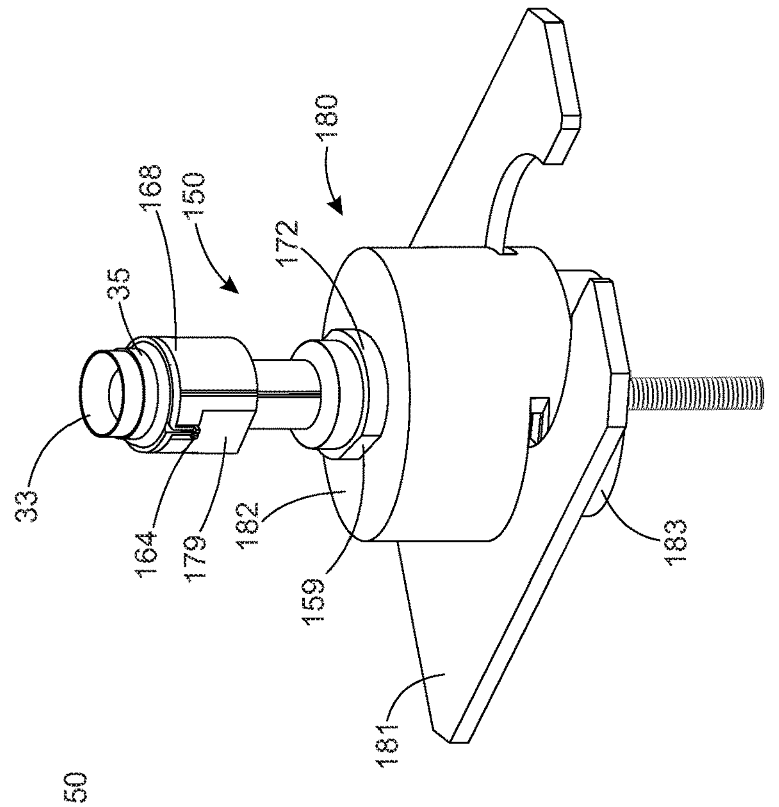
FIG. 8B is a close-up view of the lock mechanism of FIG. 8A coupled to a voice coil leadout forming tool.
Figure 8A:
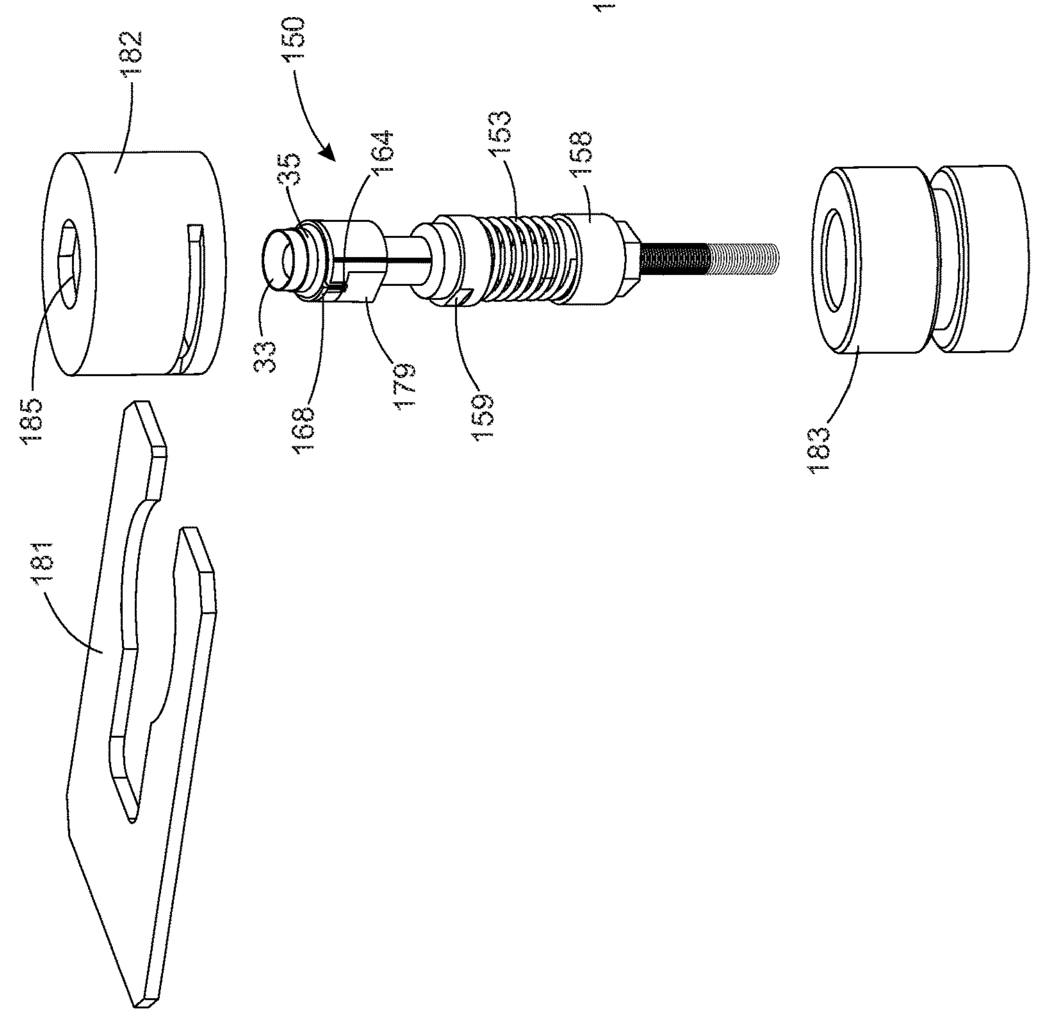
FIG. 8A is an exploded view of a lock mechanism for a voice coil leadout forming tool, in accordance with some embodiments.

A lock mechanism 180 shown in FIGS. 8A and 8B may be provided for compressing the tool coil spring 153 and lock the tool 150 in an unclamped configuration. The lock mechanism 180 may include but not be limited to a lock key 181, a lock top 182, and a lock bottom 183. The lock key 181 may be inserted in, and mate with, to the lock top 182, which in turn is positioned about the mandrel 152 of the tool 150. In particular, the lock top 182 includes a hole 185 that is shaped to receive the mandrel base 172. The hole 185 has a flat region that directly abuts the flat surfaces 159 of the mandrel base 172 to prevent rotation or undesirable motion of the mandrel 152. The lock bottom 183 in inserted about the bottom region 66 of the center pin 65 and combined with the lock top 182 may compress the coil spring 153.

A bobbin rotation stage 190 shown in FIGS. 9A and 9B may be provided for forming the leadout end regions 37A, 37B.

The bobbin rotation stage 190 may include but not be limited to a shaft knob 191, a shaft guide 192, a shaft rotation plate 193, two or more posts 194, a centering base 195, a lock bottom to centering base adapter 188, a base 196, and a shaft 197. The lock bottom adapter 188 when assembled with the centering base 195 are connected to each other with a set screw 199. The purpose of the centering base 195 is to allow precise concentric alignment of the shaft with the bobbin.

A user or machine may rotate the shaft knob 191 while applying a controlled downforce, which rotates the shaft 197, which in turn rotates the bobbin 33. For reasons described above, a rubber tip 189 of the shaft 197 may engage the bobbin 33 during rotation. The lock mechanism 150 of FIGS. 8A and 8B may hold the tool 150 in a stationary position during rotation of the bobbin 33.

As shown in FIG. 10, the helical regions 43 of the voice coil leadouts 37 are formed by the rotation of the voice coil 35 and bobbin 33, for example, using a bobbin rotation stage 190 described in FIGS. 9A and 9B and lock mechanism 180 of FIGS. 8A and 8B. In particular, the alignment tool 150, includes a portion of the expanding mandrel 152 that is positioned at the voice coil 35 and bobbin 33. Friction and tension forces are formed at the rounded edge 164P of the groove 173 of the guide insert 168 and leadout regions 37A, B (see also FIG. 7) due to the guide insert 168 remaining stationary with the expanding mandrel 152 during rotation of the voice coil 35, and a linear motion of the leadout regions 37A, B to form the helical main body 37. As rotation occurs, the extension of the leadout regions 37A, B changes so that the leadout regions 37A, B extend tangentially from the main body 36 of the voice coil 35 and down the vertical guide groove 173. The guide insert 168, or more specifically, the grooved elements 164P and 173 may establish a vertical alignment of the leadout regions 37A, B. The guide insert 168 may be formed of plastic or other rigid material.

As shown in FIG. 10, the guide insert 168 remains with the bobbin 33 and voice coil 35 after assembly of the transducer assembly, where a back plate 20 is positioned at an opposite end of the sleeve 22 as the bobbin 33. In some examples, the leadout regions 37A, 37B are glued or otherwise bonded to the guide insert 168, more specifically the rounded edge 164P of groove 173 of the insert 168, after the helicoidal leadout regions are formed. The plastic insert 168 may also protect the wire ends of the voice coil 35 during assembly as tool 150 with formed leadouts is inserted into sleeve 22, and provide a positive stop for the transducer assembly back plate.

Referring to an example illustrated at FIGS. 11-13, a tool 250 comprises a mandrel 252, a spring 253, a spring perch 254, a compliant ring 255, a center pin 265, and a set screw 267.

The mandrel 252 may be a cylindrical shaped forming mandrel that applies a force to the compliant ring 255, which in turn expands in a radial direction against the inner surface of a bobbin 33 due to compression of the compliant ring 255 between the mandrel 252 and the base 266 of the center pin 265 at a distal end of the center pin 265 and positioned inside the bobbin 33 with the compliant ring 255. The foregoing may be achieved at an end of the mandrel, which can have a taper, chamfer, bevel, or other region where the width or diameter is reduced. The base 266 of the center pin 265 preferably has a width, diameter, or other geometry that is greater than a neck of the center pin 265 constructed and arranged for insertion through the spring 253 and mandrel 252. The ring 255 may be formed of a compliant material such as foam, rubber, and so on, so that the ring 255 may return to an original state after compression.

The wire retainer 259 is positioned in a slot, groove, or the like, for example, below the voice coil 35 to hold the leadout ends 37A, 37B in a vertical alignment along the sidewall of the sleeve 22. The wire retainer 259 may function as an anchor point, or a region where adhesion such as glue may be applied to hold the voice coil wire in place after formation. As described herein, the wire retainer 259 also provide alignment at final assembly when placing the voice coil 35 in the sleeve 22.

The compression screw 267 is constructed and arranged for insertion into a cavity of the spring perch 254, which in turn can control the amount of force on the spring 253, for example, an amount of compression of the spring 253 against the mandrel 252 when the spring 253 is in an initial state, for example, an uncompressed state or a partially compressed state due to some amount of force applied to the spring 253 by the spring perch 254. In the initial state, the bobbin 33 is clamped to the tool 250. Leadouts 37A, 37B may be formed using the helix formation part 270. The spring 253 can change from the initial state to a compression state when an additional force is applied against the spring perch 254, for example, a user's hand pushing the spring perch 254 in a direction of force of the spring 253 for compressing the spring 253. Here, the base 266 of the center pin 265 is moved away from the other end of the spring 253, and therefore providing more open area for the compliant ring 255, and reducing the force of the compliant ring 255 in the radial direction. In other words, when the coil spring 253 is further compressed by an additional force applied to the spring perch 254, the compliant ring 255 is uncompressed. Thus, little or no force is applied by the compliant ring 255 against the interior wall of the bobbin 33, permitting the bobbin to be removed from the tool 250 and inserted into a sleeve (not shown) at final assembly. The wire retainer 259 is inserted into the sleeve, and captured by an opening in a helix formation part 270, which may include a notch, groove, protrusion, or the like, that mates with a notch, groove, protrusion, or the like of the wire retainer 259. The helix formation part 270 is constructed and arranged to rotate the other elements of the of the tool 250, and when rotated, forms the voice coil leadouts 37A, 37B. Thus, in some examples, tool 250 may serve two functions: a conductive wire helix forming tool and an inserting tool.

Various combinations of features of the tools illustrated and described with respect to FIGS. 2-4, 5-8, and 11-13, respectively, may be used. For example, with regard to the tool 50 illustrated and described with respect to the example in FIGS. 2-4, the guide insert 168 may be used in lieu of the guide pins 64 to forming the bend portion 39 of the leadout end regions 37A, 37B. In another example, the spring actuation for the center pin 65 shown in FIGS. 5-8 may be used in the tool 50 shown in FIGS. 2-4.

Accordingly, the examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above.

What is claimed is:

1. An electro-acoustic transducer, comprising:
- a sleeve;
- a diaphragm at a first end of the sleeve;
- a bobbin coupled to the diaphragm at an interior of the sleeve;
- a voice coil about the bobbin, the voice coil having a first helical leadout region and a second helical leadout region, the first and second helical leadout regions each including:
  - a bend portion extending tangentially away from a main body of the voice coil;
  - a helix portion that extends 180 degrees about an inner diameter of the sleeve from the main body to the bend portion; and
  - a straight portion extending at an angle from the bend portion.

2. The electro-acoustic transducer of claim 1, further comprising a circuit board at a second end of the sleeve opposite the first end, the circuit board including contact pads to which ends of the straight portions of the first helical leadout region and a second helical leadout region are coupled.

3. The electro-acoustic transducer of claim 1, wherein the bend portion of the first helical leadout region extends away from the bobbin and the main body of the voice coil to the straight portion of the first helical leadout region along a first recess of the sleeve in a direction away from the diaphragm, and wherein the bend portion of the second helical leadout region extends away from the bobbin and the main body of the voice coil to the straight portion of the second helical leadout region along a second recess of the sleeve in a direction away from the diaphragm.

4. The electro-acoustic transducer of claim 1, wherein the helix portion of each of the first and second helical leadout regions is suspended in a space between the voice coil and the inner diameter of the sleeve.

5. The electro-acoustic transducer of claim 1, further comprising a guide insert about the bobbin in the sleeve, the guide insert including a grooved element that extends along a length of the sleeve, the straight portion of at least one of the first and second helical leadout regions extending through the grooved element.

6. The electro-acoustic transducer of claim 5, wherein the grooved element includes a rounded edge about which the bend portion of the of at least one of the first and second helical leadout regions is coupled.

7. The electro-acoustic transducer of claim 5, further comprising a back plate coupled to the bobbin at a second end of the sleeve opposite the first end, the guide insert providing a positive stop for the back plate.

8. The electro-acoustic transducer of claim 5, wherein the guide insert includes a guide portion that extends to an opening at a second end of the sleeve opposite the first end and includes the grooved element.

9. A voice coil assembly of an electro-acoustic transducer, comprising:
- a main body;
- a first leadout region including:
  - a first bend portion extending tangentially away from the main body;
  - a first helix portion that extends 180 degrees about an inner diameter of the electro-acoustic transducer from the main body to the first bend portion; and
  - a first straight portion extending at an angle from the first bend portion, the first straight portion including a first leadout end; and
  - a second leadout region including:
  - a second bend portion extending tangentially away from the main body;
  - a second helix portion that extends 180 degrees about the inner diameter of the electro-acoustic transducer from the main body to the second bend portion; and
  - a second straight portion extending at an angle from the second bend portion, the second straight portion including a second leadout end.

10. The voice coil assembly of claim 9, wherein the first and second bend portions extend away from a bobbin and a diaphragm of the electro-acoustic transducer to the first and second straight portions, respectively.

11. The voice coil assembly of claim 9, wherein the first helix portion extends tangentially from the main body to the first bend portion, and wherein the second helix portion extends tangentially from the main body of to the first bend portion.

12. The voice coil assembly of claim 9, wherein the first and second helix portions are suspended in a space between a voice coil and an inner diameter of a sleeve of the electro-acoustic transducer.

13. An electro-acoustic transducer, comprising:
- a main body;
- a first leadout region including:
  - a first bend portion extending tangentially away from the main body;
  - a first helix portion that extends 180 degrees about an inner diameter of the electro-acoustic transducer from the main body to the first bend portion; and
  - a first straight portion extending at an angle from the first bend portion, the first straight portion including a first leadout end; and
- a second leadout region including:
  - a second bend portion extending tangentially away from the main body;
  - a second helix portion that extends 180 degrees about the inner diameter of the electro-acoustic transducer from the main body to the second bend portion; and
  - a second straight portion extending at an angle from the second bend portion, the second straight portion including a second leadout end.

14. The electro-acoustic transducer of claim 13, further comprising a bobbin and a diaphragm, wherein the first and second bend portions extend away from the bobbin and the diaphragm to the first and second straight portions, respectively.

15. The electro-acoustic transducer of claim 14, further comprising a guide insert about the bobbin, the guide insert including first and second grooved elements, the first and second straight portions extending through the first and second grooved elements.

16. The electro-acoustic transducer of claim 15, wherein the grooved element includes a rounded edge about which the bend portion of the of at least one of the first and second helical leadout regions is coupled.

17. The electro-acoustic transducer of claim 15, further comprising a back plate coupled to the bobbin at a second end of a sleeve opposite a first end of the sleeve, the guide insert providing a positive stop for the back plate.

18. The electro-acoustic transducer of claim 13, wherein the first helix portion extends tangentially from the main body to the first bend portion, and wherein the second helix portion extends tangentially from the main body of to the first bend portion.

19. The electro-acoustic transducer of claim 13, wherein the first and second helix portions are suspended in a space between a voice coil and an inner diameter of a sleeve of the electro-acoustic transducer.

* * * * *